US008881762B2

(12) United States Patent
Johnson et al.

(10) Patent No.: US 8,881,762 B2
(45) Date of Patent: Nov. 11, 2014

(54) SYSTEM AND METHOD IMPLEMENTING AIR SHUTOFF POSITION DETECTION STRATEGY

(75) Inventors: Travis S. Johnson, Lafayette, IN (US); Matthew J. Miller, Lafayette, IN (US); Michael E. Kenning, Zionsville, IN (US); Jason M. Brown, Simpsonville, SC (US); Dale E. Koekenberg, Logansport, IN (US)

(73) Assignee: Caterpillar Inc., Peoria, IL (US)

( * ) Notice: Subject to any disclaimer, the term of this patent is extended or adjusted under 35 U.S.C. 154(b) by 132 days.

(21) Appl. No.: 13/173,845

(22) Filed: Jun. 30, 2011

(65) Prior Publication Data

US 2013/0000730 A1 Jan. 3, 2013

(51) Int. Cl.

| | |
|---|---|
| ***F16K 37/00*** | (2006.01) |
| ***F02D 9/02*** | (2006.01) |
| ***F02D 17/04*** | (2006.01) |
| ***F02D 9/10*** | (2006.01) |
| *F02B 3/06* | (2006.01) |
| *F02D 41/04* | (2006.01) |
| *F02D 41/00* | (2006.01) |

(52) U.S. Cl.

CPC ... *F02D 9/02* (2013.01); *F02B 3/06* (2013.01); *F02D 41/042* (2013.01); *F02D 2009/0245* (2013.01); *F02D 17/04* (2013.01); *F02D 9/105* (2013.01); *F02D 41/0002* (2013.01)

USPC ......................... 137/554; 251/69; 251/129.04

(58) Field of Classification Search

USPC .......................... 137/554; 251/129.04, 67–69

See application file for complete search history.

(56) References Cited

U.S. PATENT DOCUMENTS

| | | | | |
|---|---|---|---|---|
| 3,705,594 | A * | 12/1972 | Placek | 137/1 |
| 4,201,178 | A | 5/1980 | Tyrer et al. | |
| 5,685,697 | A * | 11/1997 | Buchanan et al. | 417/12 |
| 5,771,926 | A * | 6/1998 | Medal et al. | 137/554 |
| 7,199,702 | B2 * | 4/2007 | Lizza | 340/426.18 |
| 7,284,570 | B1 * | 10/2007 | Gracik et al. | 137/554 |
| 7,444,982 | B2 | 11/2008 | Rivet | |
| 7,503,309 | B2 * | 3/2009 | Tanimura et al. | 123/396 |
| 2003/0033867 | A1 * | 2/2003 | Posey et al. | 73/168 |
| 2009/0139587 | A1 * | 6/2009 | Spliethoff et al. | 137/554 |

FOREIGN PATENT DOCUMENTS

WO WO 8905938 A * 6/1989

* cited by examiner

*Primary Examiner* — John Rivell
*Assistant Examiner* — Angelisa Hicks
(74) *Attorney, Agent, or Firm* — Uchendu O. Anyaso; Miller, Matthias & Hull

(57) ABSTRACT

An engine air shutoff valve system with an improved sensor that facilitates a position detection of the shutoff valve is disclosed. The air shutoff valve system may include a shutoff valve, an indicator, and at least one solid-state proximity sensor. The shutoff valve is moveable between an open and closed position. The indicator is operatively coupled to the shutoff valve. The indicator is movable between a normal state and a tripped state in respective correspondence with the open and closed positions of the shutoff valve. At least one solid-state proximity sensor can be configured to detect when the indicator is in the tripped state.

20 Claims, 4 Drawing Sheets

SYSTEM AND METHOD IMPLEMENTING AIR SHUTOFF POSITION DETECTION STRATEGY

TECHNICAL FIELD

The present disclosure relates generally to an engine air shutoff valve system, and more particularly, to an air intake shutoff valve system, method and apparatus for an internal combustion engine.

BACKGROUND

Conventional ways to stop diesel engines include stopping the flow of fuel to the combustion chamber. In some cases, when the diesel engine enters a run-away state, a common method of stopping the engine includes removing the air supply to the combustion chamber. This can cause the combustion chamber to be deprived of oxygen, and thus quench the uncontrolled combustion. Therefore, engines employing shut-off mechanisms may employ safety valves that cut off the air supply so as to shut off the engine during such undesired situations.

Some large engine air systems may be designed such that two air shutoff valves may be needed. A reliable detection strategy is needed in applications that require emergency shutdowns by cutting off intake air and fuel to the engine. If this strategy is not in place, a user may run the risk of operating an engine with one shutoff valve open and the other shutoff valve closed, which may cause catastrophic engine failure.

Thus, ways have been developed to monitor the status of the shutoff valves. Conventionally, air shutoff monitoring has employed mechanical and magnetic based switch technology. However, mechanical components have a limited life span due to fatigue, wear, and other factors induced by a running engine. Also, in high vibration environments, mechanical and magnetic based switches are prone to failure, thereby rendering these types of switches unreliable. As one example, mechanical switches have shown a tendency to create false positive failures, sending a detection signal when nothing physically has happened. Also, such mechanical switches can be prone to sending false signals when paired with diesel engine vibration. Failure can also occur when air shutoffs trip and only one is reset.

As a result, conventional techniques of using, for example, mechanical and magnetic based switch technology in an air shutoff system and assembly have not been effective in preventing engine failures. It is therefore desirable to provide, among other things, an improved air shutoff system and method.

SUMMARY

In accordance with one embodiment, the present disclosure is directed to an air shutoff valve system. The air shutoff valve system includes a shutoff valve, an indicator, and at least one solid-state proximity sensor. The shutoff valve is moveable between an open and closed position. The indicator is operatively coupled to the shutoff valve. The indicator is movable between a normal state and a tripped state in respective correspondence with the open and closed positions of the shutoff valve. At least one solid-state proximity sensor is be configured to detect when the indicator is in the tripped state.

In another embodiment, the present disclosure is directed to a method of controlling an air shutoff valve in an internal combustion engine. The method includes a solid-state proximity sensor monitoring an indicator, which is operatively coupled to a shutoff valve. The indicator is movable between a normal state and a tripped state in respective correspondence with open and closed positions of the shutoff valve. The solid-state proximity sensor detects when the indicator moves from the normal state to the tripped state so as to determine the open or closed position of the shutoff valve. The solid-state proximity sensor may send the detected indicator state to an electronic control module.

In another embodiment, the present disclosure is directed to an air shutoff valve assembly for selectively stopping flow of intake air in an internal combustion engine. The assembly includes a housing defining an airflow passage. An air shutoff valve is disposed in the airflow passage, the air shutoff valve being movable between an open position that permits airflow through the passage and a closed position that stops airflow through the passage. A solid-state proximity sensor is mounted proximate to the air shutoff valve. The solid-state proximity sensor is configured to emit an electromagnetic field in a direction towards an indicator coupled to the air shutoff valve. The solid-state proximity sensor detects an interruption in amplitude of the electromagnetic field when the indicator moves from a normal state to a tripped state in respective correspondence with the open and closed positions of the shutoff valve.

In another embodiment, the present disclosure is directed to an air shutoff valve system having an air intake to regulate intake airflow to an internal combustion engine. The air shutoff valve system includes a housing having an airflow passage. The air shutoff valve system also includes at least one shutoff valve disposed in the airflow passage. The at least one shutoff valve is movable between an open position that permits the intake airflow through the passage and a closed position that stops the intake airflow from flowing through the passage. At least one indicator is operatively coupled to the at least one shutoff valve. The at least one indicator is movable between a normal state and a tripped state in respective correspondence with the open and closed positions of the at least one shutoff valve. Further, the air shutoff valve system may include at least one solid-state proximity sensor configured to detect when the indicator is in tripped state. Also, an electronic control module is configured to be in communication with the at least one solid-state proximity sensor. Such an electronic control module is configured to receive a first signal associated with the detection of the indicator.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
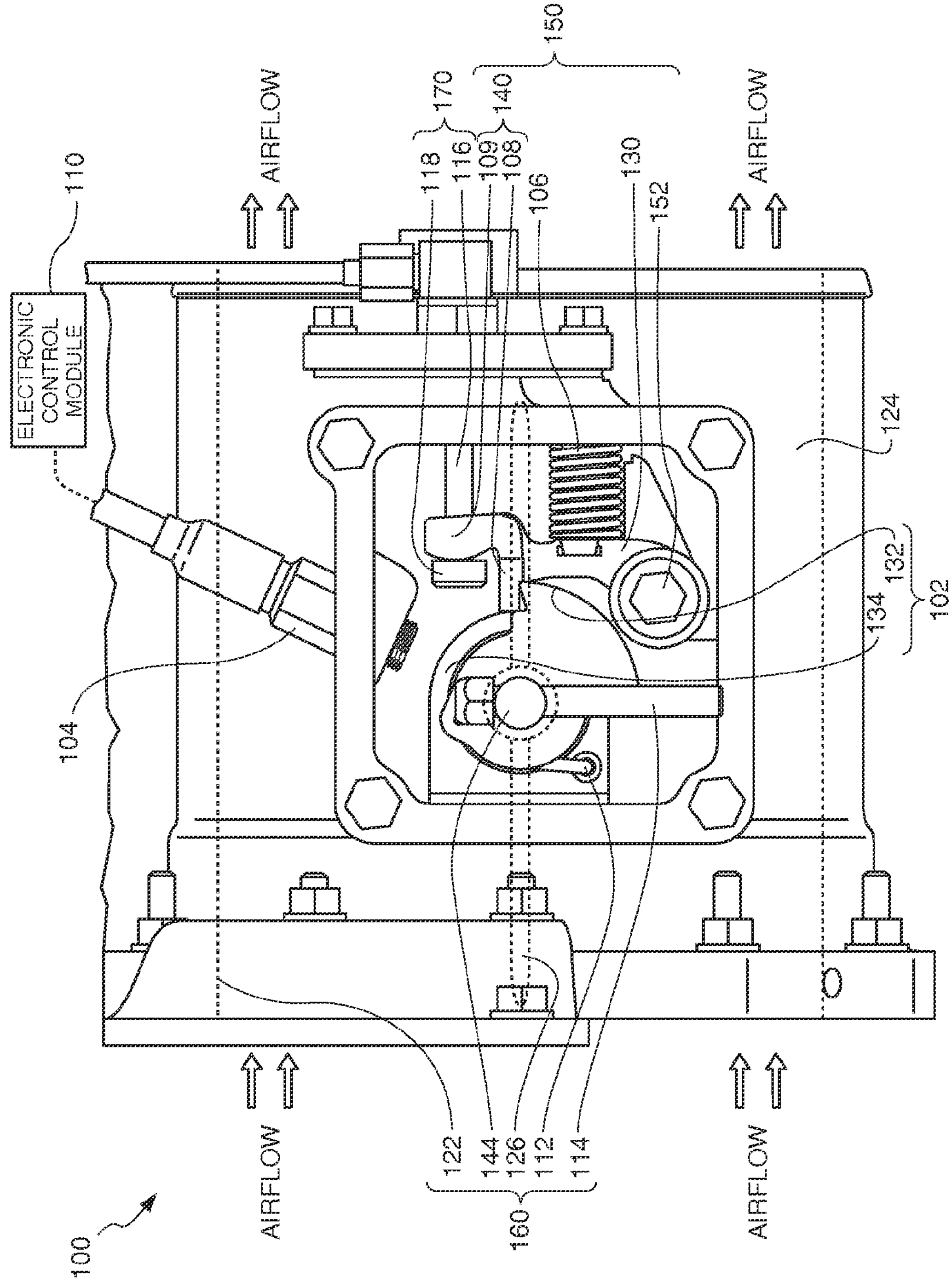
FIG. 1 illustrates a diagrammatic front view of an air shutoff valve system with an indicator shown in a normal state according to one embodiment.

FIG. 1 illustrates a diagrammatic front view of an air shutoff valve system with an indicator shown in a normal state according to one embodiment. The air shutoff valve system 100 may include an indicator 102, a lever 150, a shutoff valve assembly 160, an actuator 170, a solid-state proximity sensor 104, and an electronic control module 110. The indicator 102 includes a body 134 and a disruptive portion 132. The lever 150 includes a hinge 152, a body 130 and an L-shaped portion 140. The L-shaped portion 140 includes a first edge 108 and a second edge 109. The shutoff valve assembly 160 includes a housing 122, a shutoff valve 126, a spring 112, a handle 114, and a shaft 144. The actuator 170 includes a pin shaft 116 and a pin head 118.

The shutoff valve 126 is moveable between an open and closed position. The shutoff valve 126 may be enclosed within the housing 122 that defines an airflow passage 124. In the open position, the shutoff valve 126 is parallel to the flow of air through the airflow passage 124. In the closed position (see FIG. 2), the shutoff valve 126 is perpendicular to the flow of air through the airflow passage 124. The shutoff valve 126 can be configured as a butterfly valve. Of course, other suitable shutoff valves, such as ball valves, can be used.

The indicator 102 is operatively coupled to the shutoff valve 126. The indicator 102 can be coupled to the shutoff valve via the shaft 144 that may run through central locations of the indicator 102 and the shutoff valve 126. The indicator 102 is movable between a normal state and a tripped state in respective correspondence with the open and closed positions of the shutoff valve 126. The indicator may be composed of metal such as iron. In the normal state, the indicator 102 is held in position by lever 150 via the first edge 108. First edge 108 is adapted with a protrusion from an elongated body 130 by which a spring 106 attaches. Spring 106 provides a force required to maintain the lever 150 in a position that engages the indicator 102. More specifically, first edge 108 of lever 150 can engage the disruptive portion 132 of indicator 102 when the indicator 102 is disposed in the normal state.

The actuator 170 is connected to lever 150 to control the movements of the level 150 based on signals received from the electronic control module 110. The actuator 170 can be configured as a solenoid. Pin shaft 116 of the actuator 170 is connected to the L-shaped portion 140 via the second edge 109. The actuator 170 can be elongated in shape, and may include an enlarged head, i.e., pin head 118, formed on its distal end. Of course, the actuator 170 can be configured in other polygonal shapes such as cylindrical, or the like. The actuator 170 may serve as a coil of wire that acts as a magnet when an electric current flows through it. In another embodiment, the actuator 170 can be configured as a mechanical switch consisting of such a coil containing a metal core whose movement is controlled by the current. Although not shown, the actuator 170 can be connected to the electronic control module 110 that serves as a controller, computer or microprocessor. The electronic control module 110 determines various engine conditions and determines appropriate actions to take. In situations that the electronic control module 110 determines that airflow to the engine is to be cut off, the electronic control module 110 sends a signal (i.e., current) to the actuator 170. This can cause the actuator 170 to snap back, to thereby cause the entire lever 150 to rotate about its hinge 152, resulting in compression of spring 106. This causes the first edge 108 of lever 150 to become disengaged from the disruptive portion 132 of the indicator 102. This results in the indicator 102 being disposed in a tripped state. It is contemplated that the disruptive portion 132 can be configured as grooves, or indentations, or the like.

At least one solid-state proximity sensor 104 can be configured to detect when the indicator 102 is in the tripped state. The sensing range of the solid-state proximity sensor 104 to the indicator can be configured to be less than or equal to 6 centimeters. Such sensing range has no directionality. As a solid-state device, the solid-state proximity sensor 104 is characterized as an electronic component composed entirely of transistors and integrated circuits. The solid-state proximity sensor 104 has no moving parts. The solid-state proximity sensor 104 can detect whether the shutoff valve is in an open or closed position based on a state of the indicator 102. The solid-state proximity sensor 104 can be configured to detect the presence of nearby objects without any physical contact. The solid-state proximity sensor 104 may emit an electromagnetic or electrostatic field, or a beam of electromagnetic radiation, and then sense for changes in the field or return signal.

The solid-state proximity sensor 104 may be configured as an inductive sensor, a capacitive sensor or a photoelectric sensor. When configured as an inductive proximity sensor, such a solid-state inductive proximity sensor can detect metallic objects without being in contact with the objects. As one example, when the indicator 102 is metallic, the solid-state inductive proximity sensor may emit an electromagnetic or electrostatic field, or a beam of electromagnetic radiation, and then sense for changes in the field or return signal as a result of the indicator moving from a normal state to a tripped state. Such sensing by the solid-state inductive proximity sensor may be achieved because the solid-state inductive proximity sensor can be configured to include an induction loop. The inductance of the loop changes according to the material inside it, and since metals are much more effective inductors than other materials, the presence of metal within the indicator 102 increases the current flowing through the loop. The solid-state inductive proximity sensor may also include a sensing circuit, which can then detect such changes in the inductance loop. This information can then be reported back to the electronic control module whenever metal is detected. According to other alternative embodiments, the indicator 102 can be configured with other materials such as plastic and the like. In such cases, the solid-state proximity sensor 104 may be configured with capacitive or photoelectric sensors in order to detect such plastic targets.

In one example, the indicator 102 is disposed in a first position when in the normal state and in a second position when in the tripped state. The first position and the second position each define a different distance from the indicator 102 to the solid-state proximity sensor 104. The solid-state proximity sensor 104 can emit an electromagnetic field in a direction towards the indicator 102 to determine the state of the indicator 102. The amplitude of the electromagnetic field may change when the indicator 102 moves between the normal state and the tripped state. Such change in the electromagnetic field can occur because the distance between the solid-state proximity sensor 104 and the indicator 102 changes when the indicator moves between the normal state and the tripped state. The distance traveled by the electromagnetic waves emitted from the solid-state proximity sensor 104 to the indicator 102 changes as the emitted electromagnetic waves transition from impinging on the body 134 to impinging on the disruptive portion 132. This can cause the amplitude of the electromagnetic field to change when the indicator 102 moves between the normal state and the tripped state. As such, the solid-state proximity sensor 104 can detect that the indicator 102 is in the tripped state when there is an interruption in the amplitude of the electromagnetic field.

As one example, the solid-state proximate sensor 104 may be a solid-state inductive proximity sensor that can monitor the indicator 102, which may serve as a target. The solid-state inductive proximity sensor may emit an alternating electromagnetic sensing field. When the indicator 102, serving as the target, enters the sensing field, eddy currents may be induced in the indicator 102, reducing the signal amplitude and triggering a change of state (i.e., tripped state) at the solid-state proximity sensor 104 output. The solid-state proximity sensor 104 may include a trigger circuit configured to detect a change in amplitude of the electromagnetic field. According to one exemplary embodiment, the air shutoff valve system 100 may further include an electronic control module 110 that is electrically coupled to the solid-state proximity sensor 104. Such an electronic control module 110 may be configured to receive a first signal indicative of whether the shutoff valve is in an open or closed position.

Figure 2:
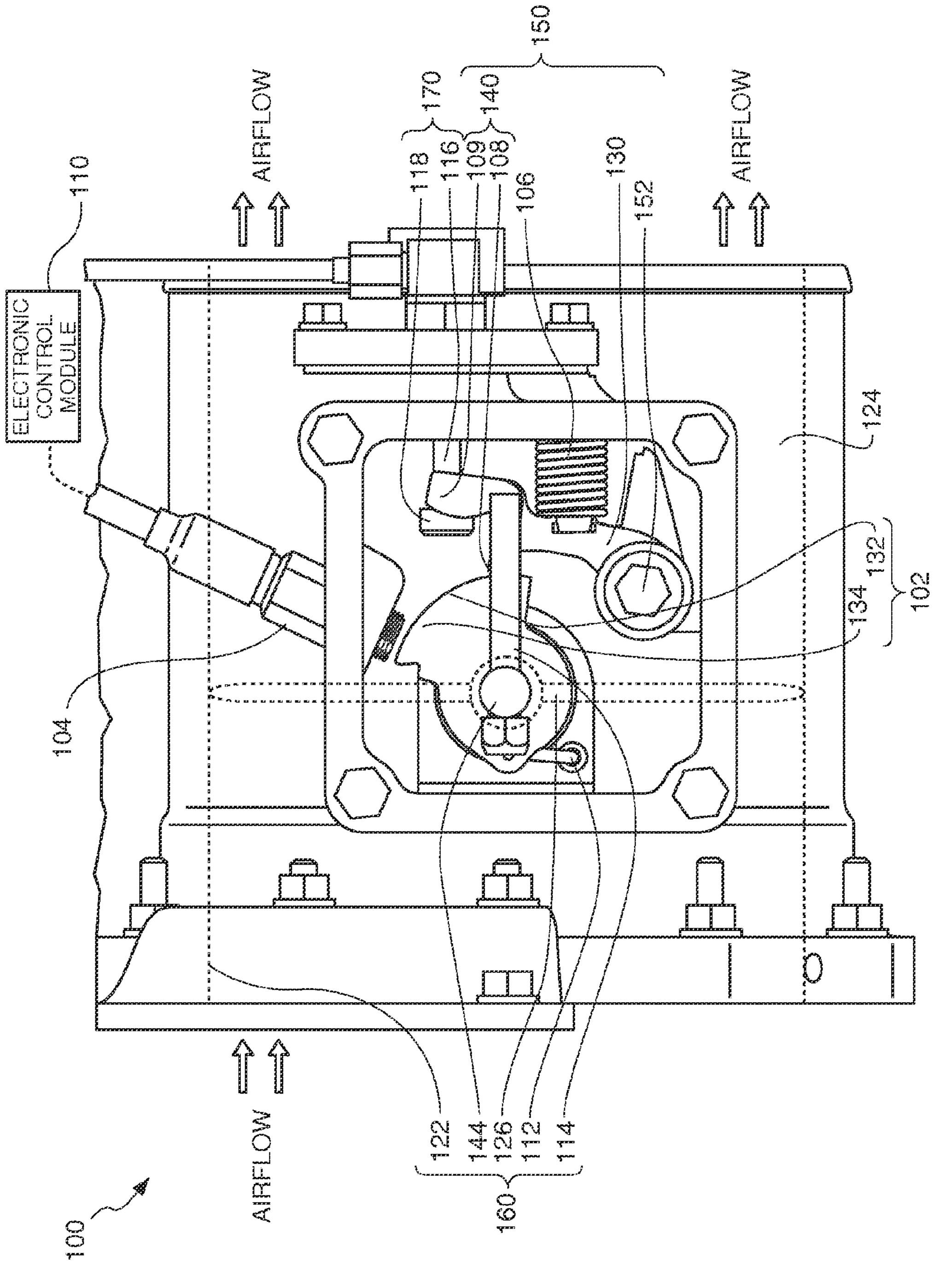
FIG. 2 illustrates a diagrammatic front view of the air shutoff valve system with the indicator of FIG. 1 shown in a tripped state according to another embodiment.

FIG. 2 illustrates a diagrammatic front view of the air shutoff valve system with the indicator 102 of FIG. 1 shown in a tripped state according to one exemplary embodiment. Generally, in engines having dual air intakes, such air shutoff techniques can be used as an extra safety precaution by allowing for notification to the engine's electronic control module when one air shutoff trips. This causes the engine to shut the other air shutoff valve. Such a strategy prevents an engine startup with one or both air shutoffs tripped/closed.

As one example, in the event the engine encounters a problem, such as a fuel combustion problem, that requires the air intake valve to shut down, the electronic control module 110 is notified. The electronic control module 110 can then send a signal (e.g., solenoid out signal) to the air shutoff valve system 100. The solenoid out signal is an electrical signal. The actuator 170 may receive this solenoid out signal. The actuator 170 may be configured such that when it receives the solenoid out signal, the pin shaft 116 of the actuator 170 retracts. Therefore, when the electronic control module 110 sends an electrical signal (e.g., solenoid out) to indicate there is a problem with the engine, such as a dysfunctional air intake valve, this causes the pin shaft 116 of actuator 170 to be pulled away rightward. The pull-away force of the actuator 170 in turn causes the lever 150 to be pulled rightward, causing spring 106 to contract or compress when the body 130 pushes against the spring 106. The pulling force of actuator 170 causes lever 150 to move in a right direction, and rotationally around hinge 152. As a result, the disruptive portion 132 of the indicator 102 becomes disengaged from the first edge 108 of lever 150. When the disruptive portion 132 is disengaged from the first edge 108, the tension in spring 112 causes indicator 102 to rotate in a counterclockwise direction. This puts the indicator 102 in a tripped state. The shutoff valve 126 correspondingly moves to its closed position due to the indicator 102 being operatively coupled to the shutoff valve 126, and the indicator 102 being movable between a normal state and a tripped state in respective correspondence with the open and closed positions of the shutoff valve 126. Also, in the indicator tripped position, solid-state proximity sensor is configured to detect a change in distance of the indicator 102 by virtue of the disruptive portion 132 being disposed at a different distance to the solid-state proximity sensor 104 in the tripped state than in the normal state, as well as a change or interruption in the amplitude of the electromagnetic waves emitted to the indicator 102.

Thus, the solid-state proximity sensor 104 can detect when the indicator 102 is in a tripped state, and then notify the electronic control module 110 that the shutoff valve is correspondingly in a closed position. By this mechanism, the engine is capable of enabling an emergency shutoff that cuts off intake air. Of course, such a mechanism can be applied in other areas such as to control, for example, flow of fuel to the engine. As such, the detection strategy described herein can be used in emergency shutdowns to cut off intake air and fuel to the engine.

To reset the indicator 102 back to its normal state, an operator can manually turn the handle 114 clockwise or counterclockwise until first edge 108 of lever 150 re-engages the disruptive portion 132 of the indicator 102. When the indicator 102 is reset, the tension in spring 112 is also set in place to facilitate the air shutoff valve system operations.

Figure 3:
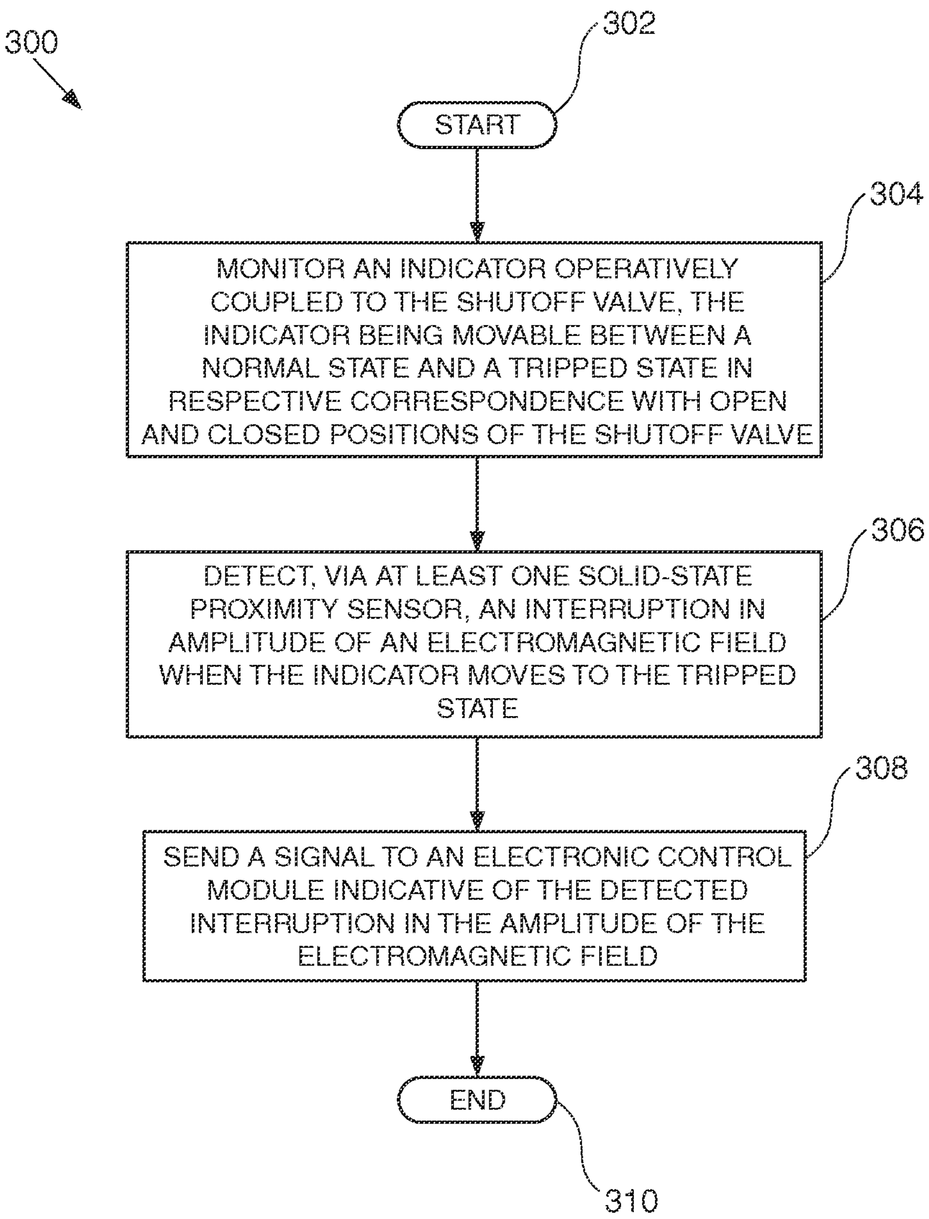
FIG. 3 illustrates in flow-chart form a method for controlling the air shutoff valve in an internal combustion engine according to one embodiment.

FIG. 3 illustrates in flow-chart form a method for controlling an air shutoff valve in an internal combustion engine as identified at 300. The method starts in operation 302. In operation 504, the solid-state proximity sensor 104 monitors the indicator 102, which is operatively coupled to the shutoff valve 126. The indicator 102 is movable between a normal state and a tripped state in respective correspondence with open and closed positions of the shutoff valve 126. The solid-state inductive proximity sensor 104 may achieve such monitoring by emitting an electromagnetic field in a direction towards the indicator 102 and then detecting any changes to the field. In operation 306, the solid-state proximity sensor 104 detects when there is an interruption in amplitude of the electromagnetic field when the indicator moves to the tripped state indicator 102. Thus, the solid-state proximity sensor may sense whether the air shutoff valve is disposed in an open or closed position based on the state of the indicator 102. In operation 308, the solid-state inductive proximity sensor 104 may send a signal to an electronic control module 110 indicative of the detected interruption in the amplitude of the electromagnetic field. The process ends in operation 310. It will be recognized that these operations may be performed in any suitable order and that other monitoring and detection techniques may be employed as desired.

Figure 4:
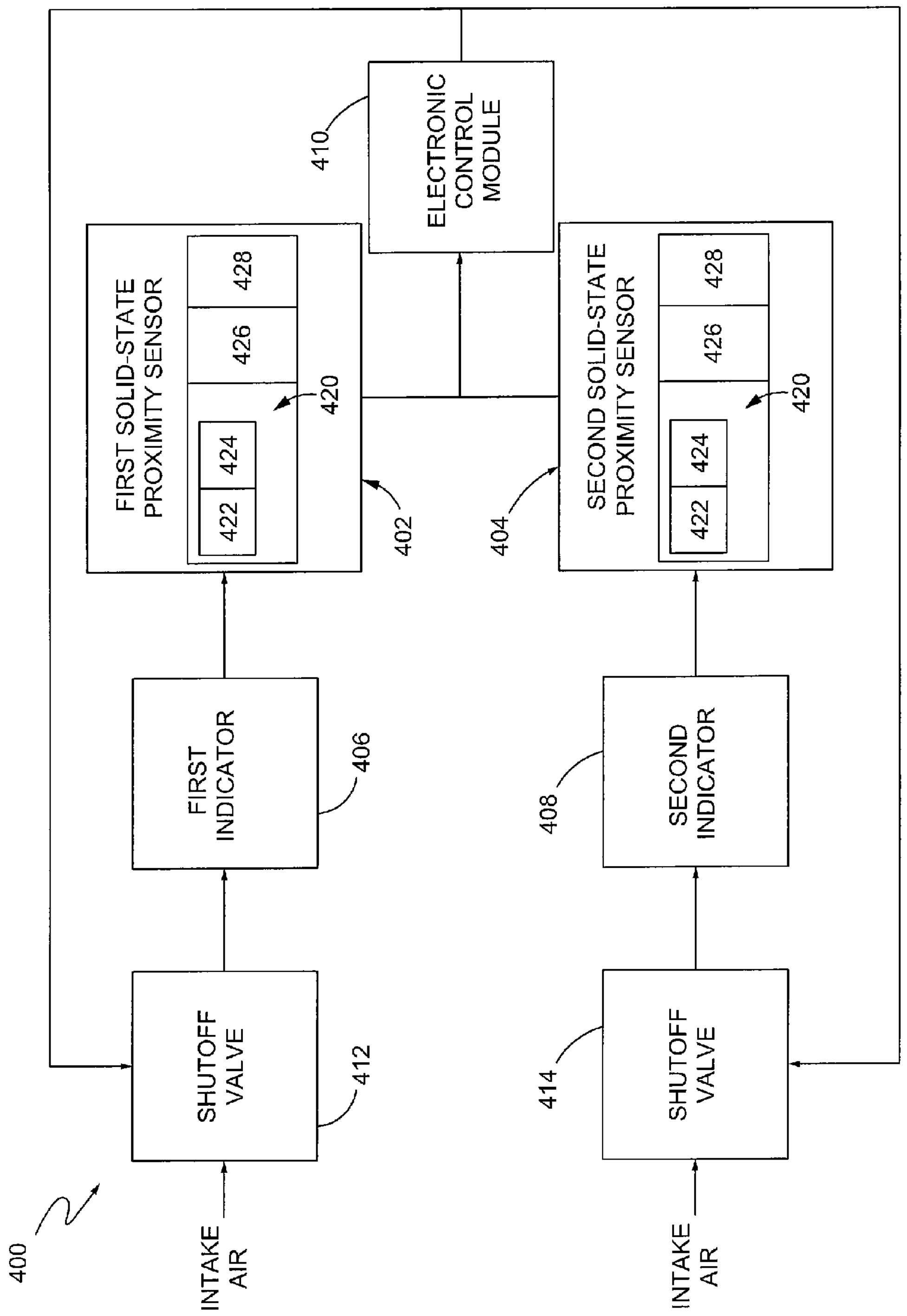
FIG. 4 illustrates a block diagram of an embodiment of an air shutoff system for an internal combustion engine.

FIG. 4 illustrates an exemplary block diagram of an embodiment of an air shutoff valve system 400 for an internal combustion engine. The air shutoff valve system 400 includes at least one intake air shutoff valve that utilizes at least one solid-state proximity sensor to detect indicator positions that correspond to the shutoff valve positions, and then communicates such indicator positions to an electronic control module.

The air shutoff valve system 400 may include a first solid-state proximity sensor 402 and a second solid-state proximity sensor 404. The first solid-state proximity sensor 402 and the second solid-state proximity sensor 404 are each configured to respectively monitor indicator 406 and indicator 408. The first solid-state proximity sensor 402 may be electrically coupled in series to the second solid-state proximity sensor 404 to generate a signal representative of a detected state of the first indicator 406 or the second indicator 408. The electronic control module 410 can be configured to receive the signal generated by the first or second solid-state proximity sensors 402, 404. Such signal notifies the electronic control module 410 when the first indicator 406 or the second indicator 408 moves from its normal state to its tripped state, signifying that a corresponding shutoff valve has moved from an open position to a closed position. In such a situation, the electronic control module 410 can send an electrical signal to the actuator 170 of air shutoff valve system 100. Such a signal when received by actuator 170 may cause the actuator 170 to retract from its position, thereby moving first edge 108 away from disruptive portion 132 of indicator 102, which then allows spring 112 to rotate the corresponding shutoff valve 412, 414 to the closed position and the corresponding indicator 406, 408 into the tripped state.

INDUSTRIAL APPLICABILITY

The disclosed air shutoff system may be provided in any machine or engine where air shutoff position detection is a requirement. As one example, an air shutoff valve system may be particularly applicable in applications that require emergency shutoffs to cut off intake air to the engine. The operation of the air shutoff valve system will now be explained.

Solid-state inductive proximity sensors 402, 404 are precision sensing devices that provide an attractive alternative to the drawbacks of mechanical and magnetic switches that are characterized by mechanical contacts, moving parts and attendant wear characteristics. As one example, the solid-state proximity sensors 402, 404 can be fully sealed against most hostile industrial environments. The solid-state inductive proximity sensors 402, 404 can be immune to vibration, and can be impervious to oils, organic cleaners, steam, water and dust. Usual positioning and operational constraints of solid-state proximity sensors 402, 404 are virtually eliminated, while life span of such sensors 402, 404 remain unaffected by problems related to mechanical wear.

The solid-state proximity sensors 402, 404 may include a radio frequency (RF) oscillator circuit 420 that may incorporate a coil 422 with a ferrite core 424, a Schmidt trigger circuit 426, and a solid-state output-switching device 428. The switching device 428 can be a transistor in DC types. In AC types, the switching device 428 can be a thyristor. The oscillator circuit 420 may generate an electromagnetic field that can be radiated from the active face of the solid-state proximity sensors 402, 404.

First and second indicators 406, 408 may serve as targets for the solid-state proximity sensors 402, 404. When first and second indicators 406, 408 are introduced into the sensing electromagnetic field, first and second indicators 406, 408 can absorb energy from the oscillator 420, which in turn changes the amplitude of oscillation. Eddy currents can be induced when there is a change in electromagnetic sensing field. Such eddy currents may be induced in the respective first and second indicators 406, 408, reducing the signal amplitude. A trigger circuit 426 of the solid-state proximity sensors 402, 404 can be configured to detect the changes in amplitude of the electromagnetic field. In response, the trigger circuit 426 can generate a signal that closes the output stage-switching device 428. When any of first or second indicators 406, 408 leaves the sensing field from its normal state, for example, the oscillator 420 regenerates and the switch 428 resets.

When either of the first indicator 406 or second indicator 408 is tripped, the corresponding solid-state proximity sensor 402, 404 can detect a change in the electromagnetic field that results due to a change in position in either the first indicator 406 or the second indicator 408. As a result, either or both of the first and second solid-state proximity sensors 402, 404 can send a signal to the engine electronic control module 410 to signify that an associated indicator has been tripped. The electronic control module 410 can then send a signal to any unaffected shutoff valve 412, 414 to enable the air shutoff valve system 400 shut down all intake airflow to the engine. It is noteworthy that the electronic control module may be configured to control fuel flow to the engine when a tripped indicator 406, 408 is detected. As such, the detection strategy described herein can be used in emergency shutoffs to cut off intake air and fuel to the engine to prevent a likely catastrophe that may result to the engine when fuel continues to flow to an engine when the engine's intake air has been shutoff. The electronic control module 410 may perform other functions such as receiving data from many other sensors and performing calculations to determine such factors as fuel-ignition timing, injection volume, etc. Also, air shutoff valve system 600 can be configured to help prevent engine startups when one or both air shutoffs are tripped.

Moreover, air shutoff valve systems employing such solid-state proximity sensors 402, 404 are likely to have a high reliability and long functional life because of the absence of mechanical parts and lack of physical contact between sensor and the sensed object. Further, the air shutoff valve system 400 uses solid-state proximity sensors 402, 404 that are characterized by being insensitive to water, oil, dirt, non-metallic particles, target color, or target surface finish, and the ability to withstand high shock and vibration environments. Further, the solid-state proximity sensors 402, 404 can be used in situations where access in the air shutoff system presents challenges or where dirt is prevalent. The sensing range of the solid-state proximity sensor 602, 604 can be adjusted to a very short range (e.g., less than 6 cm), and it has no directionality.

While this disclosure includes particular examples, it is to be understood that the disclosure is not so limited. Numerous modifications, changes, variations, substitutions and equivalents will occur to those skilled in the art without departing from the spirit and scope of the present disclosure upon a study of the drawings, the specification and the following claims.

What is claimed is:

1. An air shutoff valve system, comprising:

a housing that defines an airflow passage;

a shutoff valve disposed in the airflow passage, the shutoff valve moveable between an open position configured to permit airflow through the passage and a closed position configured to substantially stop airflow through the passage;

an indicator operatively coupled to the shutoff valve, the indicator being movable between a normal state and a tripped state in respective correspondence with the open and closed positions of the shutoff valve, the indicator including a body having a disruptive portion, the disruptive portion extending radially outward from the body; and a rotatable lever including a lever body having a first edge, the first edge protruding from the lever body and engaged with the disruptive portion of the indicator when the indicator is in the normal state;

a spring attached to the lever below the first edge, the spring compressed when the indicator is in the tripped state;

at least one solid-state proximity sensor disposed in the airflow passage and configured to detect when the indicator is in the tripped state.

2. The air shutoff valve system of claim 1, wherein the solid-state proximity sensor is configured as one of an inductive proximity sensor, a capacitive sensor and a photoelectric sensor.

3. The air shutoff valve system of claim 1, wherein the indicator is disposed in a first position when in the normal state and in a second position when in the tripped state, the first position and the second position each defining a different distance from the indicator to the solid-state proximity sensor.

4. The air shutoff valve system of claim 1, wherein the solid-state proximity sensor emits an electromagnetic field in a direction towards the indicator to determine the state of the indicator.

5. The air shutoff valve system of claim 4, wherein the solid-state proximity sensor and the indicator are positioned relative to one another such that the amplitude of the electromagnetic field changes when the indicator moves between the normal state and the tripped state.

6. The air shutoff valve system of claim 4, wherein the solid-state proximity sensor notifies an electronic control module when there is an interruption in the amplitude of the electromagnetic field that causes the indicator to move to the tripped position.

7. The air shutoff valve system of claim 1, further comprising:

an electronic control module electrically coupled to the solid-state proximity sensor, the electronic control module configured to receive, via the solid-state proximity sensor, a first signal indicative of whether the shutoff valve is in an open or closed position.

8. A method of controlling an air shutoff valve in an internal combustion engine, comprising:

monitoring an indicator operatively coupled to the air shutoff valve, the indicator being movable between a normal state and a tripped state in respective correspondence with open and closed positions of the air shutoff valve;

detecting, via at least one solid-state proximity sensor disposed in the airflow passage, an interruption in amplitude of an electromagnetic field when the indicator moves to the tripped state; and sending a signal to an electronic control module indicative of the detected interruption in the amplitude of the electromagnetic field, wherein the indicator has a disruptive portion that, when the indicator is in a normal state, selectively catches on a first edge protruding from a lever body of a rotatable lever, and does not catch on the first edge when the indicator is in the tripped state, wherein further a spring attached to the lever below the first edge is compressed when the indicator is in the tripped state.

9. The method of claim 8, wherein the solid-state proximity sensor is configured as an inductive proximity sensor, a capacitive sensor or photoelectric sensor.

10. The method of claim 8, wherein the indicator is disposed in a first position when in the normal state and in a second position when in the tripped state, the first position and the second position each defining a different distance from the indicator to the solid-state proximity sensor.

11. The method of claim 8, wherein the monitoring step further comprises emitting an electromagnetic field in a direction towards the indicator to determine the state of the indicator.

12. The method of claim 11, wherein the solid-state proximity sensor and the indicator are positioned relative to one another such that the amplitude of the electromagnetic field changes when the indicator moves between the normal state and the tripped state.

13. The method of claim 11, wherein the solid-state proximity sensor detects that the indicator is in the tripped position when there is an interruption in the amplitude of the electromagnetic field.

14. An air shutoff valve assembly for selectively stopping flow of intake air in an internal combustion engine, comprising:

a housing defining an airflow passage;

an air shutoff valve disposed in the airflow passage, the air shutoff valve being movable between an open position that permits airflow through the passage and a closed position that stops airflow through the passage; and at least one solid-state proximity sensor disposed in the airflow passage and mounted proximate to an indicator coupled to the air shutoff valve, the indicator configured to detect a change in the movable position of the air shutoff valve, wherein the solid-state proximity sensor includes a radio frequency oscillator circuit, a trigger circuit, and a solid-state output-switching device.

15. The air shutoff valve assembly of claim 14, wherein the solid-state proximity sensor and the indicator are positioned relative to one another such that the amplitude of the electromagnetic field changes when the indicator moves between the normal state and the tripped state.

16. The air shutoff valve assembly of claim 14, further comprising:

an electronic control module in communication with the solid-state proximity sensor, the electronic control module configured to control the closing of the air shutoff valve, wherein the solid-state proximity sensor is an inductive electronic sensor.

17. The air shutoff valve assembly of claim 14, wherein the air shutoff valve is configured as a butterfly valve.

18. An air shutoff valve system having an air intake to regulate intake airflow to an internal combustion engine, the air shutoff valve system comprising:

a housing defining an airflow passage;

a shutoff valve disposed in the airflow passage, the shutoff valve being movable between an open position that permits the intake airflow through the passage and a closed position that stops the intake airflow from flowing through the passage;

an indicator operatively coupled to the shutoff valve, the indicator movable between a normal state and a tripped state in respective correspondence with the open and closed positions of the shutoff valve, the indicator including a body having a disruptive portion, the disruptive portion extending radially outward from the body, the indicator biased toward the tripped state;

a rotatable lever including an elongated lever body having a first edge, the first edge protruding from the lever body and engaged with the disruptive portion of the indicator when the indicator is in the normal state;

an actuator operatively connected to the lever above the first edge, the actuator configured to rotate the lever;

a spring attached to the lever below the first edge, the spring compressed when the indicator is in the tripped state;

a solid-state inductive proximity sensor disposed in the airflow passage in the housing, the solid-state inductive proximity sensor configured to detect when the indicator is in tripped state; and an electronic control module in communication with the solid-state inductive proximity sensor, the electronic control module configured to receive a first signal associated with the detection of the indicator.

19. The air shutoff valve system of claim 18, wherein the at least one solid-state proximity sensor detects that the at least one indicator is in the tripped state when there is an interruption in an amplitude of electromagnetic field emitted by the at least one solid-state proximity sensor towards the at least one indicator.

20. The air shutoff valve system of claim 18, wherein:

the at least one shutoff valve further comprises a second shutoff valve, and the electronic control module generates a second signal to control an open and closed position of the second shutoff valve.

* * * * *